United States Patent

[11] 3,578,858

[72] Inventor Wesley A. LeMarr
New York, N.Y.
[21] Appl. No. 795,487
[22] Filed Jan. 31, 1969
[45] Patented May 18, 1971
[73] Assignee Montage Production Inc.
New York, N.Y.

[54] SLIDE MOUNT AND TAPE GUIDE
7 Claims, 7 Drawing Figs.

[52] U.S. Cl. .......... 353/120
[51] Int. Cl. .......... G03b 21/64, G03b 31/04
[50] Field of Search .......... 353/120, 19, 15; 179/100.2 (Z); 40/28.1

[56] References Cited
UNITED STATES PATENTS
2,404,761 7/1946 Westerkamp .......... 274/43X
3,176,580 4/1965 Metz .......... 353/120
3,270,614 9/1966 Paull .......... 353/120
FOREIGN PATENTS
1,180,962 11/1964 Germany .......... 353/19

*Primary Examiner*—Harry N. Haroian
*Attorney*—Amster and Rothstein

ABSTRACT: A combined transparency slide mount and magnetic tape guide having conventional means for mounting a visual transparency and having means for guiding a continuous loop of magnetic tape material through four 90° turns around the edges of said mount. The mount is for use in a slide projector which has both projection equipment and a magnetic tape head and tape drive means so that a transparency can be projected and correlated audio information can be played at the same time.

INVENTOR
WESLEY A. LeMARR
BY
ATTORNEYS

SLIDE MOUNT AND TAPE GUIDE

The present invention relates generally to tape guide means and specifically to a structure for a transparency mount which provides means for guiding a continuous loop of magnetic tape. The invention is specifically intended to provide convenient correlation of a short amount of audio information with a transparency and to provide same in a single convenient package which is easy to use.

In a large number of instances, both commercial and recreational, it is desired to couple particular transparencies with specified audio information. Examples of this range from a sales promotional program in which various pictures of products or sales techniques are combined with taped audio information in order to make a commercial presentation all the way to a conventional series of snapshots in which the photographer wishes to record and present a recorded commentary relating to the individual photographs. A number of pieces of apparatus have been contemplated and constructed in order to provide this general function. Convention slide projectors used in conjunction with simple phonographs or tape playback machines may be operated at the same time, with manual control and synchronization. More complicated equipment, including automatic programmed projectors and automatic tape recorders coupled to the projectors have been constructed. These, of course, have a significant failing in that the tape recorded message can be used only when the slides are arranged in the exact order contemplated when the tape was recorded. Even more complicated constructions have been proposed in which an enlarged tape slide mount is used and the tape is coiled or bunched inside the slide mount and means are provided in a specially constructed projector to play the audio material recorded on the tape. Although this concept of building the tape directly into the slide mount has significant advantages a commercial embodiment of this idea has not been successfully produced.

It is desirable to provide and there is a need for an apparatus where an audio message may be coupled with a given transparency in a convenient and small package. It is desirable in such a system that the transparency carry its own means for recording the audio information; this eliminates any need for special handling or specialized control equipment to synchronize the audio information with the projected transparency—they are inherently coupled. It is desirable that the means used be compatible with conventional projectors (without audio) so that the slide mounts may be used in exactly the same manner as conventional slide mounts. An additional advantage of compatible mounts is that existing slide projectors may be simply modified in order to both show the slide and play the recorded sound information.

Accordingly, it is generally an object of the present invention to provide an improved slide mount. Specifically, it is an object of the present invention to provide a simple, small slide mount which has built-in audio recording means.

In accordance with one illustrative embodiment of the present invention, there is provided a combined slide mount and magnetic tape guide for the mounting of a conventional transparency in association with means for magnetically recording sound information. A mount body is formed with a central transparency window and means are provided surrounding said window for guiding a continuous loop of tape. The tape is guided along a first face of the body along a first edge, through a 90° turn onto the second face of the body along a second edge, through a further 90° turn onto the first face and along a third edge and through a still further 90° turn back onto the second face and along the fourth edge of the body and, finally, through a fourth 90° turn back onto the first face of the body and along its first edge. The body is cut away along one of the edges sufficiently to allow access to a continuous loop of tape located on the guide means so that it can be engaged by a magnetic tape head and tape drive means. Cover means are provided on each side of the body which have a transparency window and with a window for access to the magnetic tape.

A more complete understanding of the present invention will be obtained by reference to the following detailed description of a presently preferred embodiment, when taken in conjunction with the accompanying drawings wherein.

Figure 1:
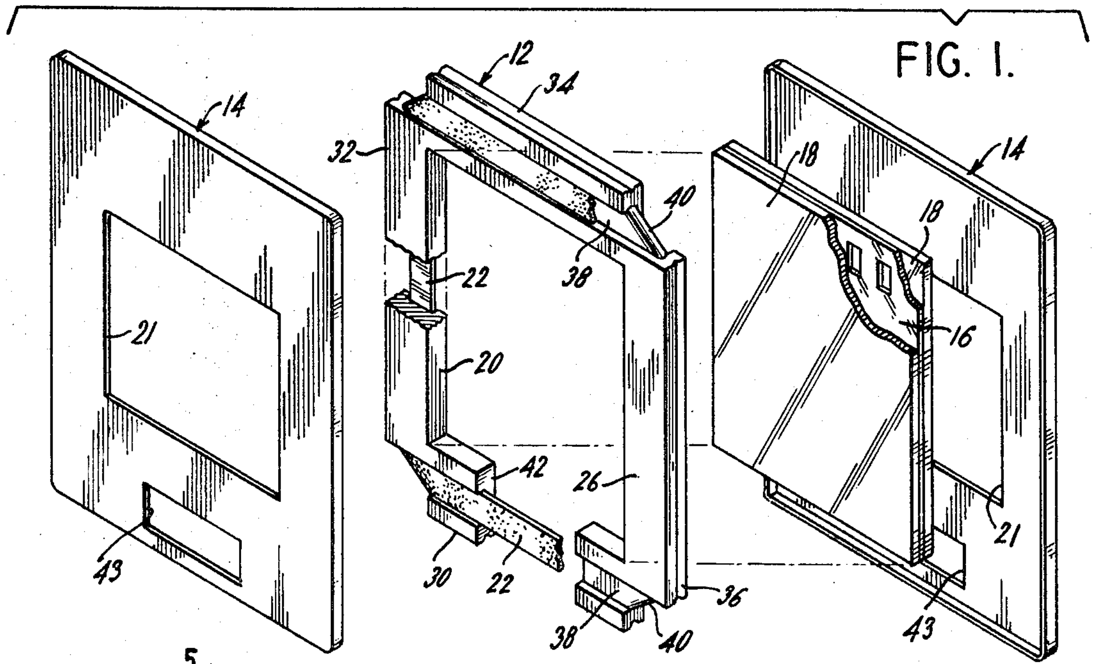
FIG. 1 is an exploded perspective view of one embodiment of a slide mount according to the invention showing the slide mount body, a continuous tape mounted thereon, a transparency secured between two pieces of glass mounted in the body and cover means to enclose the entire device.

Referring now specifically to the drawings, there is shown a slide mount and tape guide generally designated by the numeral 10. The slide mount 10 includes a body 12, which is preferably molded of plastic material, and covers 14 which are used to enclose all or part of the body 12. The slide mount 10 holds a transparency 16 which is preferably protected by a pair of glass sheets 18. The transparency 16 and the glass sheets 18 are fitted within a transparency window 20 formed within the body 12. A loop of continuous magnetic tape material 22 is mounted on the body 12 and is guided around the four edges thereof by guide means formed in the body 12.

Description will now be made of the tape guide means formed in the body 12. For purposes of this description it should be understood that the body 12 has two faces, a first face 26 and a second face 28, and four edges, 30, 32, 34 and 36 (best seen in FIGS. 1 and 3). A tape channel 38, rectangular in cross section, is formed parallel to each of the four edges 30, 32, 34 and 36 and is of a width slightly larger than the width of the magnetic tape 22 (which is typically one-eighth of an inch). Adjacent edges 30 and 34, the tape channel 38 is formed as a depression in the first face 26 of the body 12 and adjacent the edges 32 and 36, the tape channel 38 is formed as depressions in the second face 28 of the body 12.

At each of the four corners, there are formed 90° flip-over guides 40. These flip-over guides 40 are simply rounded edges which serve to bring the separate portions of the tape channel 38 into communication with each other. The flip-over guides 40 are oriented at exactly 45° to the length of the respective channels 38 and the tape 22 is housed within the channel 38 and wrapped around the flip-over guides 40.

Figures 2, 3, 4:
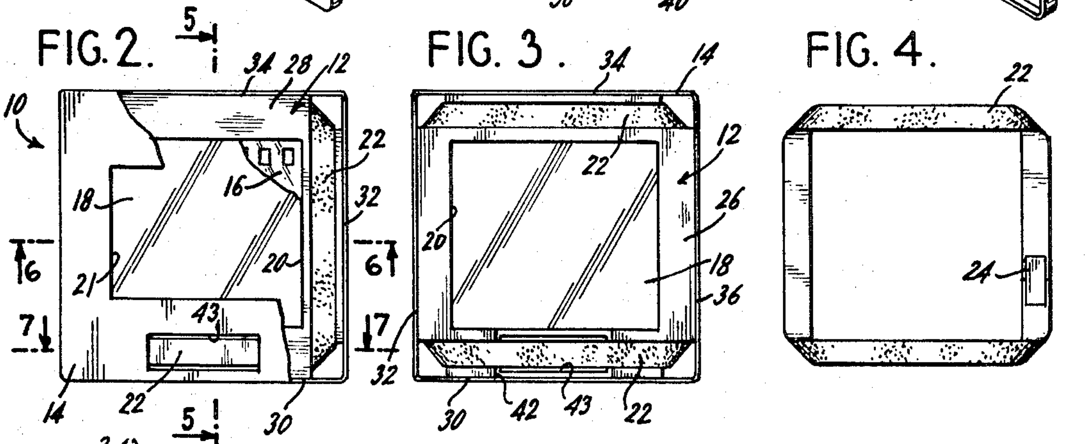
FIG. 2 is an elevational view, with portions broken away for illustrative purposes, of the device shown in FIG. 1.
FIG. 3 is a view similar to that shown in FIG. 2 but viewed from the opposite side and with the cover removed.
FIG. 4 is a view of the continuous loop of tape used in the slide mount in accordance with the present invention.
Figure 5:
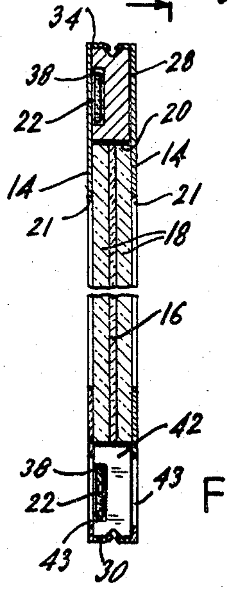
FIG. 5 is a sectional view taken along the line 5–5 of FIG. 2.
Figure 6:
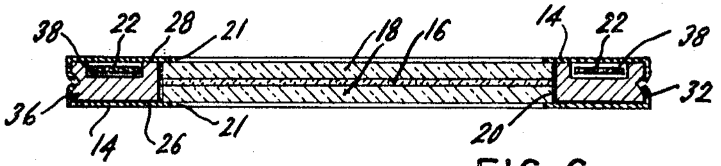
FIG. 6 is a sectional view taken along the line 6–6 of FIG. 2.

An understanding of the tape drive means in the body 12 may be obtained by considering the following description of the influence of the tape guide means on a single small piece of tape in the tape loop 22 as it travels around the body 12. The piece of tape is located within the tape channel 38 and is prevented from movement transverse the length of the tape by the inside walls of the channel 38. Assuming that the piece of the tape 22 starts its movement from the lower right-hand corner of the body 12 (as seen in FIG. 1), the tape is moved along its own length, guided by these walls of the channel 38, until it reaches the corner between the edges 30 and 32. The flip-over guide 40 at that corner guides the tape through a 90° turn and from the first face 26 of the body to the second face 28 so that the tape is then in the guide channel 38 parallel to the second edge 32 of the body 12. After moving the length of the second edge, the piece of tape is then guided around the flip-over guide 40 at the corner between edges 32 and 34 such that the tape is then located within the guide channel 38 parallel to the third edge 34. The tape continues within the guide means and again moves from the first face 26 to the second face 28 at the corner between side edges 34 and 36 as guided by the flip-over guide located at that intersection. The tape then moves down the length of the channel 38 parallel to the fourth edge 36. Finally, the individual piece of tape is guided once more from the face 28 to the face 26 by the flip-over guide 40 at the fourth corner (the one between edges 36 and 30) and the piece of tape is then located in the channel 38 adjacent edge 30 at the position where this narrative started.

In order to provide access to the loop of tape 22 when positioned on the body 12, there is an access opening 42 formed along one edge of the body 12, and in this case along edge 30. In the present embodiment, the access opening 42 is simply formed by not having any plastic material at all along one portion of the edge 30. It will be appreciated by providing complementary openings in the covers 14, access to the tape 22 may be made for purposes of driving it and engaging it with a magnetic head to receive the audio information recorded thereon. The tape can be fitted onto the body 12 either by assembly with the splicing tape 24 (see FIG. 4) or the sides 32, 36 of the body 12 can be pressed together as the loop of tape 22 is threaded into the guide means.

It will be appreciated that the sheets of glass 18 are employed for protection and, in a manner known in the prior art, fit within the transparency window 20 of the body 12. Between the sheets of glass 18 is mounted the transparency 16 and thus the glass 18 and the inside edges of the transparency window 20 provide the means for mounting and centering the transparency 16. Of course, any one of the many conventional mounting means for transparency can be employed in combination with the tape guide means provided in accordance with the present invention.

Figure 7:
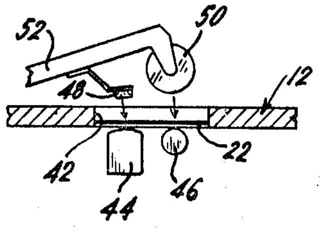
FIG. 7 is a partial and sectional view taken along the line 7–7 of FIG. 2 and is a schematic illustration of a tape head and tape drive mechanisms which may be used in conjunction with the illustrated slide mount.

The slide mount and tape guide 10 may be used in a conventional slide projector in the conventional manner. In addition, the device finds advantageous use in a projector which has, in addition to the conventional equipment, a tape drive and tape pickup means. These are shown schematically in FIG. 7 where 44 represents a tape head and 46 represents a tape drive capstan. A backup pad 48 for the tape head 44 and an idler wheel 50 for the capstan 46 are mounted on an arm 52. When it is desired to either record onto or playback from the tape 22, the arm 52 is moved toward the tape head 44 and the capstan 46 such that the tape is driven against and past the tape head 44 in the conventional manner. Preferably, the tape head 44 moves transversely of the tape 22 such that a signal can be recorded on the tape 22 in a generally helical pattern so that several complete turns of the single loop of tape 22 may be used for one continuous message. Alternately, a signal can be recorded on the tape in stepwise fashion with the tape head 44 making the appropriate stepwise motion or, if desired, a single passage of the tape loop may be sufficient for one message.

It will be appreciated that the device, in accordance with the present invention, provides means for recording and reproducing an audio signal correlated to a given transparency, all packaged in a slide mount, the external dimensions of which are substantially the same as existing conventional slide mounts. This structure allows a transparency contained within a mount in accordance with the present invention, to be shown in a conventional manner on conventional projection equipment. However, the transparency can also be shown and, at the same time, the specific correlated audio signal can be automatically reproduced without any need for specialized control equipment to achieve the correlation. Furthermore, a group of slides and their respective associated recorded messages can be reproduced in any order desired and the proper message will automatically appear with its mating transparency.

Although the foregoing description has been directed to only one version of the present invention, many modifications of the embodiment shown can be made and still incorporate the basic teachings of the invention. Accordingly, the following claims should be construed with regard to the scope of the invention and should not be limited to the specific embodiment as described herein.

I claim:

1. A combined slide mount and magnetic tape guide for the correlated mounting of a visual transparency and associated flat audio tape comprising:

- a body having a first and second side, a central transparency window formed in said body, said body having mean surrounding said transparency window for guiding a continuous loop of tape in a plane parallel to said first and second sides and said window and along a first edge through a 90° turn and then along a second edge of said body through a 90° turn and then along a third edge of said body through a still further 90° turn and then along a fourth edge of said body and through a still further 90° turn back along said first edge of said body;
- a tape mounted on said body and within said guiding means with the plane of said flat tape being parallel to the planes of said sides and said window; and
- means for mounting a transparency in said transparency window.

2. A device in accordance with claim 1 wherein said tape guide means comprises a channel formed in said body on said first side thereof and adjacent said first and third edges and on said second side thereof adjacent said second and fourth edges.

3. A device in accordance with claim 2 wherein said guide means includes four 90° flip-over guides each having a smooth turning edge in communication with and forming a part of said channel and oriented at 45° to said edges.

4. A device in accordance with claim 3 wherein said body is formed with free access to a tape located within said channel along at least a portion of at least one edge thereof for engagement by a magnetic head and by drive means for the tape.

5. A device in accordance with claim 4 including cover means engaged on said body and covering at least a portion of said tape guide means.

6. A mount in accordance with claim 5 wherein said cover means is formed with a transparency window in alignment with the location of a transparency in said body and a tape window in alignment with the free access location of said tape.

7. A combined slide mount and magnetic tape guide for the correlated mounting of a visual transparency and associated audio magnetic tape comprising:

- a body having a central transparency window formed therein, said body having means surrounding said transparency window for guiding a continuous loop of tape from a first side of said body along a first edge through a 90° turn and then along a second side and a second edge of said body through a 90° turn and then along said first side and along a third edge of said body through a still further 90° turn and then along said second side and then along a fourth edge of said body and through a still further 90° turn back to said first side and along said first edge of said body;
- a tape mounted on said body and within said tape guiding means; and
- means for mounting a transparency in said transparency window.